United States Patent
Brechenmacher

(10) Patent No.: US 11,717,946 B2
(45) Date of Patent: Aug. 8, 2023

(54) TORQUE WRENCH EVALUATION SYSTEM AND METHOD

(71) Applicant: ATLAS COPCO INDUSTRIAL TECHNIQUE AB, Stockholm (SE)

(72) Inventor: Uwe Brechenmacher, Baiersbronn (DE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 510 days.

(21) Appl. No.: 17/041,329

(22) PCT Filed: Mar. 6, 2019

(86) PCT No.: PCT/EP2019/055538
§ 371 (c)(1),
(2) Date: Sep. 24, 2020

(87) PCT Pub. No.: WO2019/185317
PCT Pub. Date: Oct. 3, 2019

(65) Prior Publication Data
US 2021/0023685 A1    Jan. 28, 2021

(30) Foreign Application Priority Data
Mar. 27, 2018  (SE) .................................. 1830100-2

(51) Int. Cl.
*B25B 23/142* (2006.01)
*G01L 5/24* (2006.01)

(52) U.S. Cl.
CPC ...... *B25B 23/1425* (2013.01); *B25B 23/1427* (2013.01); *G01L 5/24* (2013.01)

(58) Field of Classification Search
CPC .... B25B 23/1425; B25B 23/1427; G01L 5/24
See application file for complete search history.

(56) References Cited

U.S. PATENT DOCUMENTS

| | | | | |
|---|---|---|---|---|
| 5,662,012 | A | * | 9/1997 | Grabovac ........... B25B 23/1427 81/467 |
| 6,167,788 | B1 | | 1/2001 | Schoenberger et al. |
| 7,900,524 | B2 | | 3/2011 | Calloway et al. |
| 11,052,517 | B2 | * | 7/2021 | Hsieh .................. B25B 23/0007 |

(Continued)

OTHER PUBLICATIONS

International Search Report (ISR) dated Jun. 26, 2019 issued in International Application No. PCT/EP2019/055538.

(Continued)

*Primary Examiner* — David B. Thomas
(74) *Attorney, Agent, or Firm* — Holtz, Holtz & Volek PC

(57) ABSTRACT

A method for evaluating a condition of a torque wrench includes connecting the torque wrench to an adapter, detecting a click point, where a click mechanism of the torque wrench is decoupled from a first position into a second position, and measuring a click torque value at the click point, detecting a peak point and measuring a peak torque value at the peak point, detecting a release point, where the click mechanism is moving back from the second position into the first position, and measuring a release torque value at the release point, determining that the evaluation was performed correctly if the click point, the peak point and the release point were detected.

16 Claims, 4 Drawing Sheets

(56) References Cited

U.S. PATENT DOCUMENTS

| | | | |
|---|---|---|---|
| 11,541,519 B2* | 1/2023 | Banzola | G06K 7/10366 |
| 2017/0144281 A1 | 5/2017 | McDonald et al. | |
| 2018/0065237 A1 | 3/2018 | King et al. | |

OTHER PUBLICATIONS

Written Opinion dated Jun. 26, 2019 issued in International Application PCT/EP2019/055538.

* cited by examiner

TORQUE WRENCH EVALUATION SYSTEM AND METHOD

TECHNICAL FIELD

The invention relates to the field of apparatuses, devices and methods for testing mechanical and mechatronic torque wrenches. The invention covers in particular a method and a device that allow to detect wrong handling when testing a torque wrench, wrong handling during normal tightening operations and to detect mechanical or other damages in the torque wrench.

BACKGROUND OF THE INVENTION

Mechanical or mechatronic torque wrenches typically comprise a mechanism having a spring and some kind of releasable clutch mechanism that disengages from a first position into a disengaged second position. Typically the clutch mechanism comprises a spring or bending part that disengages a cam element from a cam surface. This releasable clutch mechanism is widely described and named click mechanism and is further explained herein referring to FIGS. 1 to 2b.

A torque is typically applied to a fastener or a joint via a torque wrench having some kind of an adapter that fits onto the fastener, bolt, screw or nut. Once a tightening starts, the torque builds up until a click point of the click mechanism is reached. At the click point the click mechanism disengages from the first position into the second position and this click point can be felt (tactile or haptic feedback on the torque wrench) on the lever and grip of the torque wrench so that the operator knows that the click point has been reached and the target torque is applied to the joint. The disengagement from the first position into the second position is normally occurring over a small movement thus a peak torque at a peak point is usually reached right after the click point, since the torque wrench will typically be overturned a bit by the operator or a testing stand/device. In other words a click torque value at the click point is not the highest torque applied but instead it is a peak torque value at the peak point, which is the highest torque value. This is the case even if the handling of the torque has been detected to be correct. Both, mechanical and mechatronic torque wrenches comprise such a click mechanism.

The click point can be adjusted typically via a rotating grip on the torque wrench that is compressing or releasing and thus pretensioning a spring that pushes onto the cam element. The rotating grip may be arranged so that a range of torque indicated on a scale is visible when rotating the grip.

Mechanical and mechatronic torque wrenches need to be adjusted and checked, once directly after production before they are released and then, at least in industrial applications, on a regular basis to double check that the values on the scale and at the click point are accurate and match the scale and the actual joint, when a joint is tightened.

The click point and the peak point can be detected, for instance if the torque wrench is connected to a testing device. Such a testing device has typically been used to determine the click point based on a torque development over time when a torque wrench is coupled to the testing device and torque is applied for instance to a shaft of the testing device via an adapter. Since the click point follows a distinguished curve when torque is measured over time it is possible to detect it. The same can be said for the peak point. It is possible to detect the highest torque during the testing phase, which highest torque and peak point, respectively, typically occur after the click point.

In many cases it is however not always sure that the testing of the torque wrench has been done correctly. For instance if only the peak torque at the peak point is measured then it is possible that the testing device only registers the peak torque but does actually not know if the click point was reached or not. The same can happen if only a click point is detected. If the curve follows a similar shape as when a real click point occurs, the testing device can be tricked into thinking that the click point was reached and that the click mechanism clicked even if the click mechanism actually did not click or disengage.

In view of this it was suggested to measure both the click point and the click torque value and the peak point and the peak torque value. This improves the reliability of the testing but the risk of detecting wrong handling still remains. For instance if the curve of torque development over time follows a similar shape as the one that actually follows the distinguished curve having a click point and a peak point, then it is still possible to trick the testing device into thinking that the click point and the peak point were reached and the click mechanism disengaged (click point), even if it was not the case. In addition it is not possible to detect if there is a mechanical or material problem in the torque wrench when only measuring the torque at the click point and the torque at the peak point. In view of the foregoing there is thus a need to further improve the testing procedure of torque wrenches.

SUMMARY OF THE INVENTION

An object of the present invention is to improve the testing procedure for mechanical and mechatronic torque wrenches. A further object of the present invention is to provide a reliable and accurate diagnosis of condition of a mechanical or mechatronic torque wrench.

The inventors of the present invention have through test and evaluation investigations determined that it is possible to not only detect and measure the torque at the click point and the peak point but also at a release point where the click mechanism moves back from the second position into the first position. Detecting the release point and measuring the torque at the release point improves the diagnosis and the detection of wrong handling and wrong testing procedure. The inventors have further discovered that the torque at the release point, thus the release torque value, is typically lower than the click torque value and the peak torque value, respectively.

Disclosed herein is a method for evaluating a condition of torque wrench comprising the steps of:
  connecting a torque wrench to an adapter;
  detecting a click point, where a click mechanism of the torque wrench is decoupled from a first position into a second position, and measuring a click torque value at the click point;
  detecting a peak point and measuring a peak torque value at the peak point;
the method further being characterized by the steps of:
  detecting a release point, where the click mechanism is moving back from the second position into the first position, and measuring a release torque value at the release point; and
  determining that the evaluation was performed correctly if the click point, the peak point and the release point were detected.

The above method allows detecting if a test of the torque wrench was performed correctly. In addition it allows to obtain further information about the condition of the mechanical parts in the torque wrench. Detecting the release point allows to determine, in particular, if the handling was correct;—in other words if the click mechanism was really clicked and if the peak point was reached and also if the release point was passed when releasing a force from the torque wrench.

The above method can be applied in an actual mechanical or mechatronic torque wrench as integrated testing method or in a separate testing device as further described below.

In an embodiment the method further comprises the step of determining that the evaluation was not performed correctly, if any of the click point, the peak point and the release point were not detected.

Thus if any of the above points, click point, peak point or release point were not detected it can be determined that test was not performed correctly or that the torque wrench has a problem such as a mechanical problem.

In an embodiment the method may further comprise the steps of determining, which of the click torque value, the peak torque value and the release torque value, respectively, is the greatest value and which one is the second greatest value, if the click point, the peak point and the release point were detected.

This allows extracting further information about the handling of the test by an operator and the condition of the torque wrench.

In a further embodiment, the method may comprise the steps of determining that the evaluation was performed correctly if the release torque value is smaller or equal to the click torque value and if the click torque value is smaller or equal to the peak torque value.

Typically, if the handling of the torque wrench during the test was performed correctly, and if the torque wrench is not damaged in any way, the peak torque value will be the highest followed by the click torque value and then the release torque value is the smallest of the three values.

The three values may also be compared to statistical values for click torque value, peak torque value and release torque value, for example via a database. Such statistical data may give a reliable assessment of the condition of the torque wrench.

In another embodiment the method may further comprise the step of calculating a difference between the click torque value and the release torque value and compare this difference to a database with statistical or historical values of differences in order to assess the condition of the torque wrench.

This delta torque value or difference can give information about the condition of the torque wrench, in particular if it is compared with a database comprising a plurality of delta torque values or differences from torque wrenches that were in good condition.

Preferably the torque value is measured continuously over time in particular during the evaluation of the torque wrench.

Alternatively, if the method is performed within a torque wrench the torque value may be measured continuously versus a change in angle position of the torque wrench during the evaluation of the torque wrench.

In other words a position of a lever of the torque wrench is considered to be the zero or initial position once the torque wrench is connected to a mating adapter. As soon as the lever starts to pivot around the mating adapter the change in angle is detected and measured versus time.

The above measuring of the torque over time and wrench angle, respectively, allows to generate a curve and thus to detect discontinuities in a torque curve and to signal that the torque wrench has a mechanical problem if any discontinuity besides the click point and the release point is detected in the torque curve.

The invention also covers a device for evaluating a condition of torque wrench comprising:
  a processing unit;
  a signalling unit connected to the processing unit;
  an adapter;
  a torque sensor connected to the adapter and connected to the processing unit; wherein the processing unit is configured to receive data from the torque sensor in order to detect a click point, where a click mechanism of the torque wrench is decoupled from a first position into a second position, and measure a click torque value at the click point and to detect a peak point and measure a peak torque value at the peak point,
  characterized in that the processing unit is further configured to detect a release point, where the click mechanism is moving back from the second position into the first position, and measure a release torque value at the release point, the processing unit being further configured to determine that the evaluation was performed correctly, if the click point, the peak point and the release point were detected, the signalling unit being configured to signal to a operator that the evaluation was performed correctly if the click point, the peak point and the release point were detected.

The device allows detecting if a test of the torque wrench was performed correctly. In addition it allows to obtain further information about the condition of the mechanical parts in the torque wrench. Detecting the release point allows to determine, in particular, if the handling was correct;—in other words if the click mechanism was really clicked and if the peak point was reached and also if the release point was passed when releasing a force from the torque wrench.

The above device can be used in an actual mechanical or mechatronic torque wrench as integrated testing unit or as a separate testing device as further described below referring to the figures.

The adapter may be a mating adapter on a shaft of a torque wrench, it may be the actual shaft of the torque wrench or it may be an adapter for the shaft of the torque wrench on the testing device. Typically the adapter is a square shaped shaft.

In an embodiment the torque wrench may be a mechanical torque wrench. In another embodiment the torque wrench may be a mechatronic torque wrench.

When the device is integrated in a torque wrench, the torque may be measured continuously versus time or a change in angle position of the torque wrench.

If the device is integrated in the torque wrench, it is further possible to use it to evaluate every tightening operation during normal use and to signal to the operator that the tightening of the specific joint was in order and ok or if it was not ok to signal this clearly to the operator.

As mentioned, in an embodiment the device may be a testing apparatus comprising a housing, which embeds the processing unit, the torque sensor and at least a part of the adapter and the signalling unit.

When the device is a testing apparatus the torque may be measured versus time.

The signalling unit may be a loudspeaker or a display, or could be any other for the purpose available signalling means

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Figure 1:
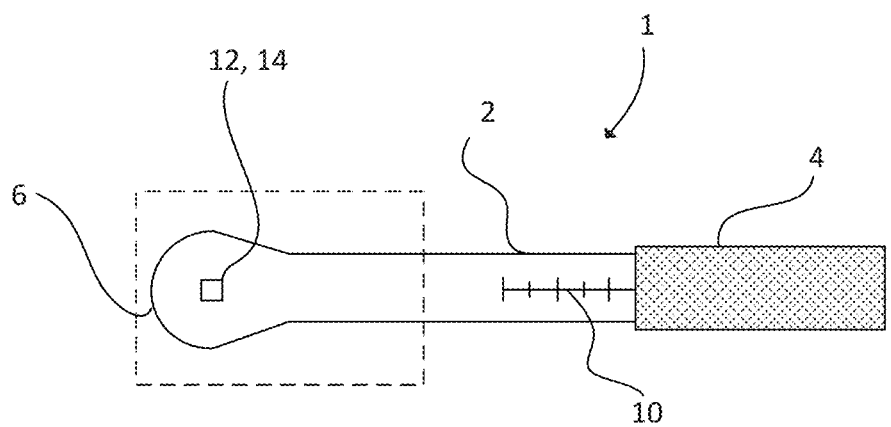
FIG. 1 schematically illustrates a torque wrench.

FIG. 1 schematically illustrates a torque wrench 1 comprising a lever 2, a grip 4, which grip 4 can be rotated around its longitudinal axis, and a torque output end 6. The grip 4 can be rotated in order to adjust a compression or pretension in a spring 8 (shown in FIGS. 2a and 2b) in order to adjust the output torque at a click point. The grip 4 may be adjusted according to a scale 10, for example imprinted on the lever 2 of the torque wrench 1. The torque output end 6 comprises a shaft 12 having an adapter 14, which can be connected to a mating adapter (not shown) or the like. The adapter can be a separate element connected to the shaft (not shown) or it can simply be a special shape of the actual shaft 12 such as a square shape as shown in FIG. 1.

Figure 2A:
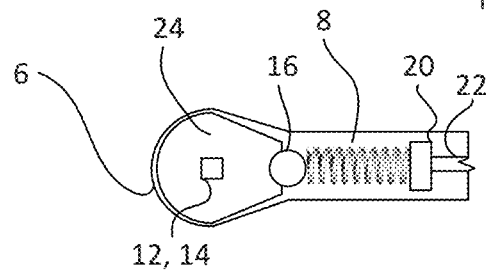
FIG. 2a schematically illustrates a click mechanism of the torque wrench in a first position.
Figure 2B:
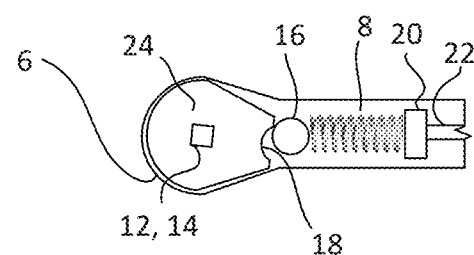
FIG. 2b schematically illustrates the click mechanism of the torque wrench in a second position.

FIGS. 2a and 2b are illustrations of the part the torque wrench that is indicated with a dashed rectangle in FIG. 1. For illustrative purposes a part of the torque output end 6 and the lever 2 is removed so that a click mechanism within the torque wrench is visible. The click mechanism comprises the spring 8, a clutch element 16 here in the form of ball, for example made of metal, a cam surface 18 as best shown in FIG. 2b and some kind of movable element 20 that is connected to the grip 4 via a spindle 22 or the like. Different type of arrangements for click mechanisms are known. With the herein disclosed device and method any type of available and known click mechanism operating with some kind of disengagement upon reaching of a threshold force, can be evaluated. The movable element 20 is configured to push or release the spring 8 upon rotation of the grip 4 in order to adjust the pretension of the spring 8 and thus to adjust a click torque value at the click point. The click mechanism further comprises a pivotable torque wrench head 24 arranged within the torque output end 6. The torque wrench head 24 comprises the shaft 12 or adapter 14.

FIG. 2a illustrates the click mechanism in a first engaged position where the clutch element 16 is engaged snug in the cam surface 18. In this first position torque can be output via the shaft/adapter 12, 14 and a bolt or the like can be rotated and a joint can be tightened. Once a click torque value is reached a further pivoting or rotation of the lever 2 of the torque wrench 1 will lead to a disengagement between the clutch element 16 and the cam surface 18, since the spring 8 can no longer hold the clutch element 16 in the cam surface 18, and the click mechanism is moved into its second position as shown in FIG. 2b. This movement can be felt and heard by an operator as a click. This click indicates to the operator that she/he no longer needs to further tighten the joint and that the lever 2 can be released.

From the illustration in FIGS. 2a and 2b it becomes clear that, in practice, the operator will "overdraw" the lever so that the click torque value is actually not the highest torque applied but rather a peak torque value at a peak point that is reached shortly after the click point. This is mainly due to the reaction time of the operator and the short angle movement during which the click mechanism disengages. Once the operator or automatic testing stand reacts and the hand or force delivering unit releases the lever, the operator or the testing stand has already "overdrawn" the lever slightly. This difference is small but measurement equipment can detect the click point and the click torque value and the peak point and peak torque value. After the lever 2 is released by the operator the click mechanism moves back again from the second position into the first position, thus from FIG. 2b to FIG. 2a, and this point, the release point and the corresponding release torque value, is detected by the measurement equipment according to the invention. Typically this release torque value is smaller than the click torque value, which click torque value is again smaller than the peak torque value.

Figure 3:
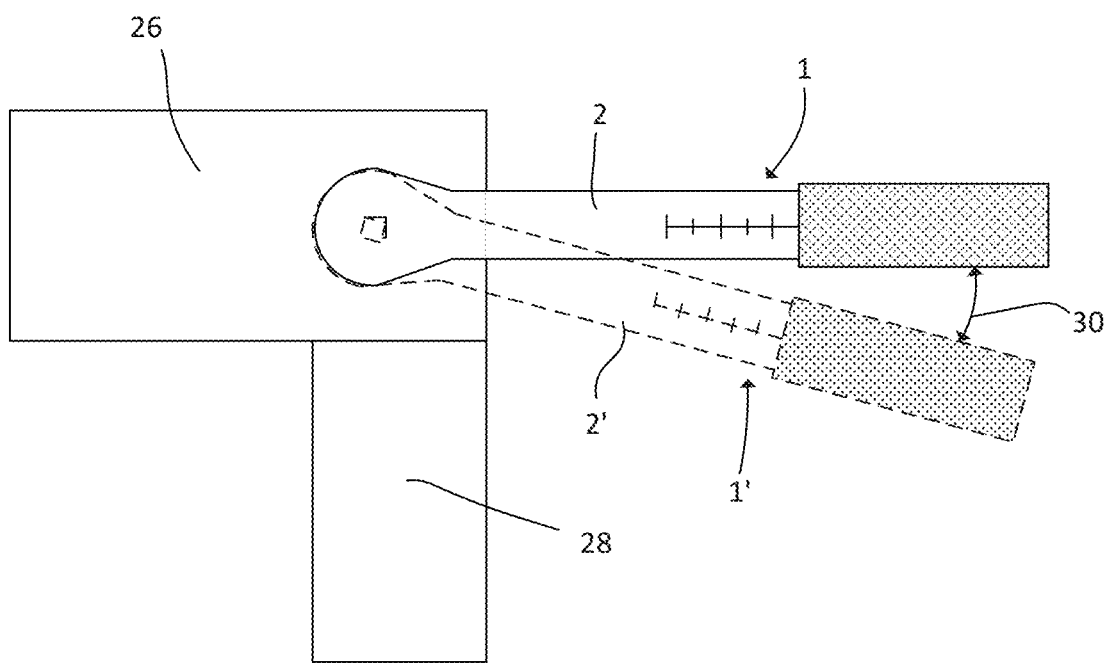
FIG. 3 schematically illustrates an angle of the torque wrench when tightening a joint, in this case two metal sheets.

FIG. 3 schematically illustrates a torque wrench 1 used to tighten a joint between two metal sheets 26, 28. The metal sheets are only used for illustrative purposes. Once the torque wrench 1 is connected to a screw of the joint the operator will start pivoting the torque wrench 1 around the screw so that it reaches a position that is illustrated in FIG. 3 as a dashed torque wrench 1'. The angle 30 of rotation of the lever 2, 2' is illustrated. This angle 30 can be detected, for example via measurement apparatus integrated in the torque wrench 1, 1'.

Figure 4:
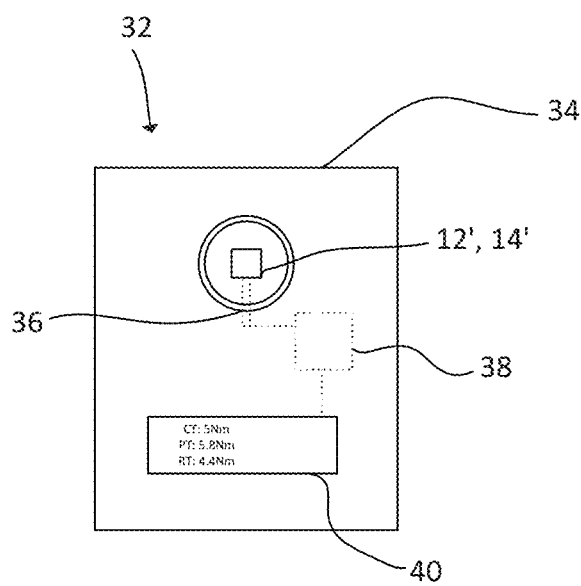
FIG. 4 schematically illustrates a testing apparatus according to the invention.

FIG. 4 illustrates a testing apparatus 32 according to the invention. The testing apparatus 32 is capable of detecting the click point, the peak point, the release point and the corresponding click torque value, peak torque value and release torque value. The testing apparatus 23 is further capable of recording and analysing a torque curve versus time in order to extract information from the torque curve as explained later herein referring to FIGS. 5 to 7.

Still referring to FIG. 4, the testing apparatus 32 comprises a housing 34, an adapter 14' connected to a shaft 12'. The adapter 14' is configured to receive the adapter 14 from the torque wrench 1 (c.f. FIG. 1) in order to transfer torque from the torque wrench 1 to the shaft/adapter 12', 14' of the testing apparatus 32. Similar as described in connection with FIG. 1, the adapter may have a special shape and be a separate piece connected to the shaft (not shown) or it may be embodied as a special shape of the shaft 12' as illustrated in FIG. 4. Illustrated in dotted lines in FIG. 4, since these parts are normally not visible, are a torque sensor 36 and a processing unit 38. The torque sensor 36 is connected to the shaft 12' or adapter 14' and the processing unit 38. The torque sensor 36 may use strain gauges on the shaft 12' or adapter 14' or the like for detecting torque. The strain gauges are set under electric energy and the deformation of the strain gauges will affect the electric impedance, which again allows to determine the applied torque to the shaft 12'/adapter 14'. Alternatively surface acoustic wave devices may be used to detect the torque in the shaft 12' and adapter 14' respectively. The processing unit 38 may comprise a processor and a memory in order to run computer software. The processing unit 38 may further be connected to a signalling unit 40, in FIG. 4 illustrated as a display showing the detected torque value for click torque (CT), peak torque (PT) and release torque (RT). The values shown in FIG. 4 are just for illustrative purposes.

The testing apparatus 32 of FIG. 4 is illustrated as a separate unit it is however possible to integrate all parts such as the torque sensor 36, the processing unit 38 and the signalling unit 40 in the torque wrench 1 of FIG. 1 (not shown). The torque sensor 36 would then be connected to the shaft 12 and adapter 14, respectively of the torque wrench 1 and the signalling unit 40 would be positioned on the torque wrench so that it is easily visible for the operator.

Figure 5:
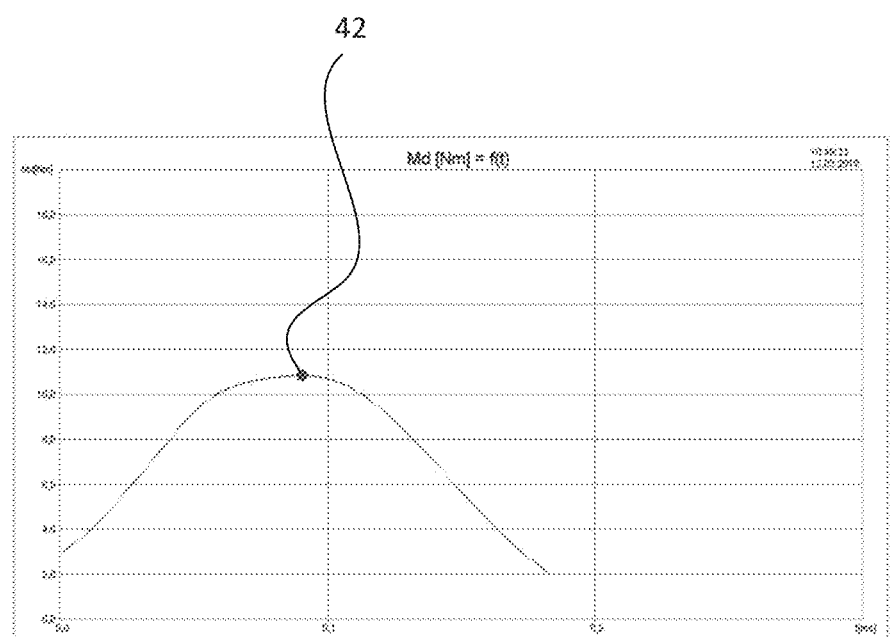
FIG. 5 schematically illustrates the development of torque over time in a first case.

FIG. 5 illustrates a torque curve having a peak point 42 where a corresponding peak torque value is measured. In order to evaluate a torque wrench this is not sufficient. Only detecting the peak point 42 and the corresponding peak torque value would result in an incomplete and therefore inaccurate assessment of the torque wrench. It is not possible to detect a click point from the torque curve in FIG. 5. With the described device and method it is possible to detect that no click point and no release point are present in the torque curve of FIG. 5. Thus, if only detect the peak point is detected then this will be signalled, for example directly to the operator. Then the evaluation can be repeated or the torque wrench can be repaired, for instance if the click mechanism is broken and no click point can be generated during the evaluation.

Figure 6:
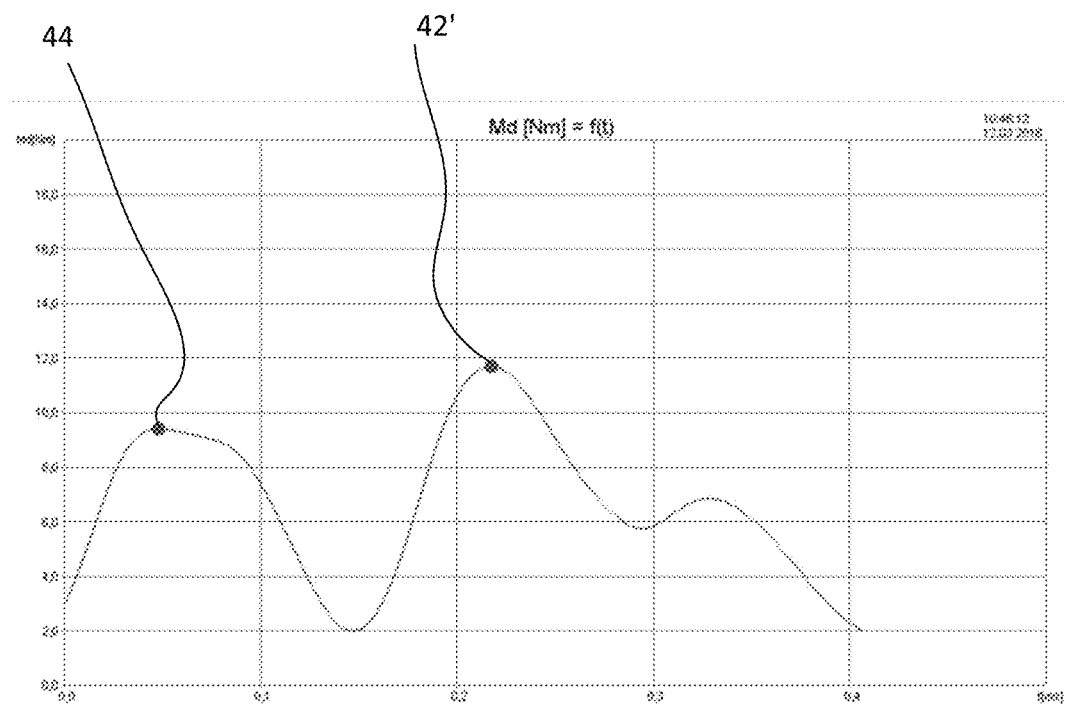
FIG. 6 schematically illustrates the development of torque over time in a second case.

FIG. 6 illustrates a torque curve having a click point 44 and the peak point 42' but no release point. The click point 44 is however not a real click point 44 since the click mechanism was never clicked since there is no release point. Given that the time frame during which the torque curve of FIG. 6 was recorded is very short (about 0.4 milliseconds) the processing unit will detect the click point 44 anyway and also the peak point 42'. However, the processing unit cannot detect the release point because the click mechanism was never triggered. Once this is detected it will signalled to the user. Then the evaluation is repeated or the torque wrench is repaired since the click mechanism could be defect. The torque curve in FIG. 6 can also originate in a wrong handling of the torque wrench during the evaluation;—The operator may pull the lever 2 to generate the false click point 44, without reaching the real click point and then release it a bit for a few fractions of a millisecond before pulling again to reach the peak point 42', which would be wrong handling. As already mentioned it is also possible that the click mechanism in the torque wrench is somehow defect, which could lead to the torque curve illustrated in FIG. 6.

Figure 7:
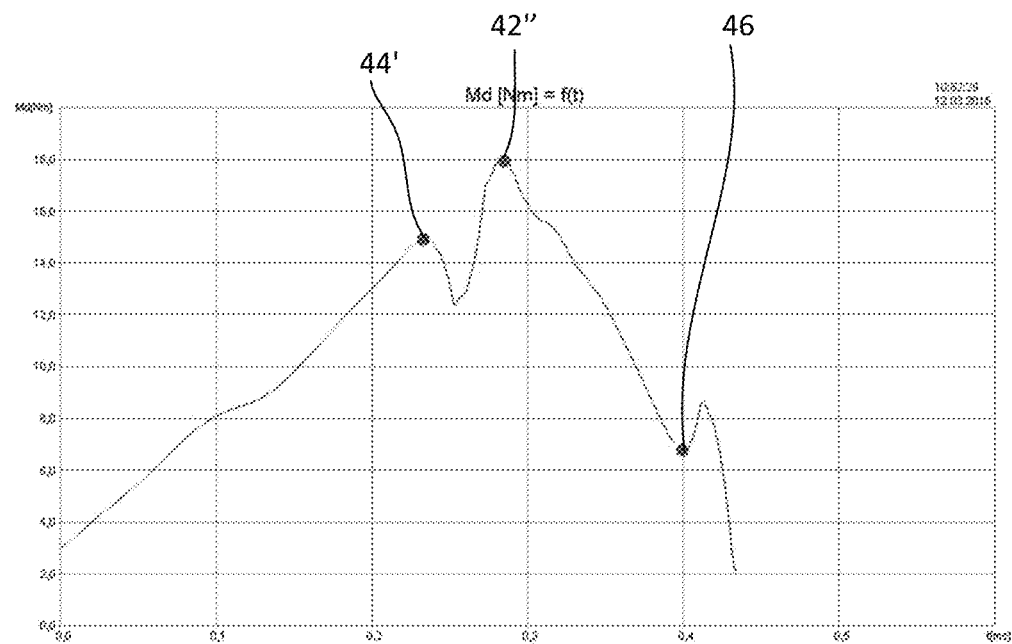
FIG. 7 schematically illustrates the development of torque over time in a third case, where points according to the invention are determined and corresponding torque values are measured.

FIG. 7 shows a correct torque curve, comprising a click point 44', a peak point 42" and a release point 46. From such a torque curve it can be determined that the click point 44', 42" and the release point 46 were detected and that the evaluation was performed correctly. When determining the corresponding click torque value, the peak torque value and the release torque vale, it can further be detected that the peak torque value is the greatest of the three values, the click torque value the second greatest and the release torque value the smallest. Such a detection of the torque values can further improve the evaluation and can also be signalled to the user. If the sequence of the measured torque values is not peak torque value smaller or equal to click torque value smaller or equal to release torque value, then it can be determined that there is a problem and that the evaluation needs to be performed again or that the torque wrench is somehow damaged.

FIGS. 5 to 7 only show exemplary torque curves, whereby FIG. 7 shows a correct torque curve where it can be safely assessed that the click point and thus the release point were reached and the handling during the evaluation was correct. There are many other possible torque curves that may and can occur that are either correct or not correct. For instance the torque curve in FIG. 7 illustrates two disruptions, the click point 44' and the release point 46. It is possible that a torque curve shows other disruptions (not shown), such other disruptions can be detected by the method and the processing unit, respectively, and such a detection can also be signalled. Typically, such other disruptions indicate a mechanical problem with the torque wrench and the click mechanism, respectively.

Still referring to FIG. 7 another value that is of interest is the delta or difference between the click torque value and the release torque value. This delta or difference indicates if the torque wrench is in good condition when it matches delta values or differences from a database comprising several such delta values for similar or the same torque wrenches that were successfully tested. One can imagine that for instance wear on the click mechanism, mechanical damage, and/or dirt in the torque wrench can affect this delta value or difference.

Figure 8:
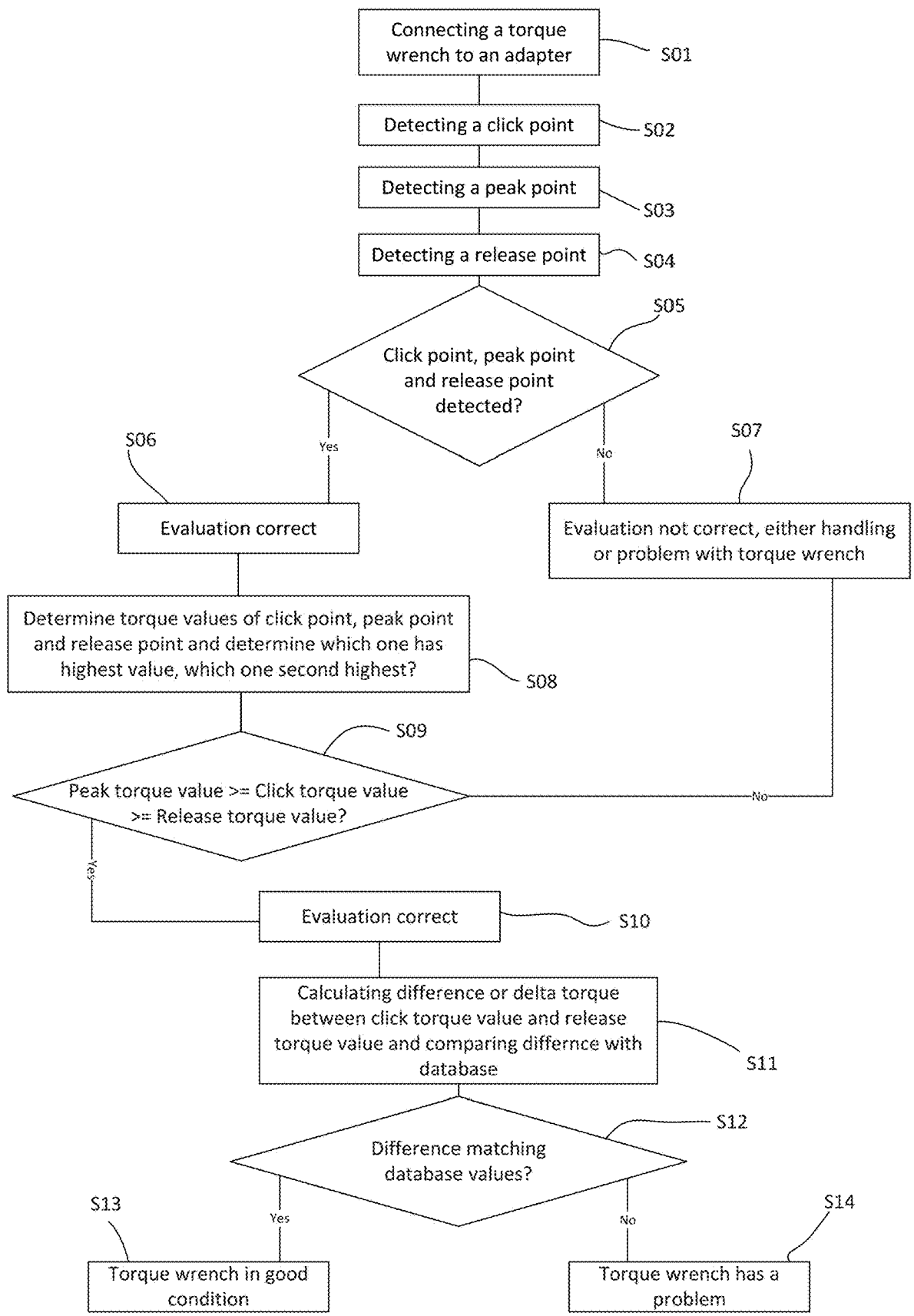
FIG. 8 schematically illustrates a method according to the invention.

FIG. 8 illustrates a method for evaluating a condition of a torque wrench according to the invention. The method comprises the steps of:
  connecting S01 a torque wrench to an adapter;
  detecting S02 a click point, where a click mechanism of the torque wrench is decoupled from a first position into a second position, and measuring a click torque value at the click point;
  detecting S03 a peak point and measuring a peak torque value at the peak point.

The method comprises further the step of:
  detecting S04 a release point, where the click mechanism is moving back from the second position into the first position, and measuring a release torque value at the release point; and
determining S05, S06 that the evaluation was performed correctly if the click point, the peak point and the release point were detected.

The detection of the click point 44', the peak point 42" and the release point 46, as illustrated in FIG. 7, leads to the determination that the evaluation was performed correctly. It can be stated that the detection of the click point 44', the peak point 42" and the release point 46 leads to a comparably high certainty that the evaluation was performed correctly.

If any of the click point 44', the peak point 42" and the release point 46 was not detected S07 then it is determined that the evaluation was not performed correctly. This means that either the handling was not correct during the evaluation or that the torque wrench has some kind of mechanical or other problem.

In order to further improve the meaningfulness of the evaluation the values of the detected click point, peak point and release point may be detected and sorted S08 according to their quantity/size. It may further be determined S08 which of the torque values of click point, peak point and release point has highest value and which is the second highest value. If the peak torque value is bigger or equal to the click torque value and the click torque value is bigger or equal to the release torque value S09 then it is determined that the evaluation was performed correctly S10. If this is not the case it is determined that something is wrong S07, such as the handling or the mechanics of the torque wrench.

A further step of the method may comprise to determine S11 a difference between the click torque value and the release torque value if all three points, such as the click point 44', the peak point 42" and the release point 46 were detected.

The difference is then compared S12 to a database comprising statistical/historical values of successfully tested torque wrenches, for example of such differences or deltas of click torque value to release torque and it is evaluated S12 if the difference matches these statistical values S13 or not S14.

Alternatively or additionally to comparing the above difference or delta between the click torque value and the release torque value to statistical or historical values in a database, it is also possible to compare all of the three values independently, the click torque value, the peak torque value and the release torque value, to statistical or historical values from a database to evaluate the handling during the evaluation and/or to evaluate the mechanics and thus the condition of the torque wrench.

The outcome or result of any of the steps S06, S07, S10, S13, S14 are preferably signalled, acoustically, visually or tactile, to the user so that the user can approve the torque wrench, repeat the evaluation or send the torque wrench to repair or discard of it depending on the outcome of the evaluation.

The invention has now been described referring to the FIGS. 1 to 8 relating to a torque wrench. The testing apparatus could further be applied in or to other mechanical tools or measurement equipment. The figures exemplary show the invention and they are in no way intended to limit the invention to the embodiments shown in the description.

The invention claimed is:

1. A method for evaluating a condition of a torque wrench comprising:
   connecting the torque wrench to an adapter;
   detecting a click point, where a click mechanism of the torque wrench is decoupled from a first position into a second position, and measuring a click torque value at the click point;
   detecting a peak point and measuring a peak torque value at the peak point;
   detecting a release point, where the click mechanism is moving back from the second position into the first position, and measuring a release torque value at the release point; and
   determining that an evaluation was performed correctly if the click point, the peak point, and the release point were detected.

2. The method according to claim 1, further comprising determining that the evaluation was not performed correctly, if any of the click point, the peak point, and the release point were not detected.

3. The method according to claim 1, further comprising determining which of the click torque value, the peak torque value, and the release torque value, is the greatest value and which one is the second greatest value.

4. The method according to claim 3, further comprising the step of determining that the evaluation was performed correctly if the release torque value is equal to or less than the click torque value and if the click torque value is equal to or less than the peak torque value.

5. The method according to claim 1, further comprising calculating a difference between the click torque value and the release torque value and comparing the difference to a database with statistical values of differences in order to determine the condition of the torque wrench.

6. The method according to claim 1, further comprising measuring a torque value continuously versus time during the evaluation of the torque wrench.

7. The method according to claim 6, further comprising detecting discontinuities in a torque curve and signaling that the torque wrench has a mechanical problem if any discontinuity besides the click point and the release point is detected in the torque curve.

8. The method according to claim 1, further comprising measuring a torque value continuously versus a change in angle position of the torque wrench during the evaluation of the torque wrench.

9. The method according to claim 8, further comprising detecting discontinuities in a torque curve and signaling that the torque wrench has a mechanical problem if any discontinuity besides the click point and the release point is detected in the torque curve.

10. A device for evaluating a condition of a torque wrench, the device comprising:
    a processor;
    an output device connected to the processing unit;
    an adapter; and
    a torque sensor connected to the adapter and connected to the processor;
    wherein the processor is configured to receive data from the torque sensor and to:
       detect a click point, where a click mechanism of the torque wrench is decoupled from a first position into a second position, and measure a click torque value at the click point,
       detect a peak point and measure a peak torque value at the peak point,
       detect a release point, where the click mechanism is moving back from the second position into the first position, and measure a release torque value at the release point, and
       determine that an evaluation was performed correctly, if the click point, the peak point, and the release point were detected, and
    wherein the output device is configured to signal to an operator that the evaluation was performed correctly if the click point, the peak point, and the release point were detected.

11. The device according to claim 10, wherein the device is integrated in a torque wrench for continuous quality check, and wherein the adapter is connected to a shaft of the torque wrench.

12. The device according to claim 11, wherein the torque wrench is a mechanical torque wrench.

13. The device according to claim 11, wherein the torque wrench is a mechatronic torque wrench.

14. The device according to claim 11, wherein torque is measured continuously versus time or a change in angle position of the torque wrench.

15. The device according to claim 10, wherein the device is a testing apparatus comprising a housing, which includes the processor, the torque sensor, at least part of the adapter, and the output device, and wherein the output device a display.

16. The device according to claim 15, wherein the torque is measured continuously versus time.

* * * * *